US012580946B2

(12) United States Patent
Sharpe et al.

(10) Patent No.: US 12,580,946 B2
(45) Date of Patent: Mar. 17, 2026

(54) SYSTEMS AND METHODS FOR TRIGGERING TOKEN ALERTS

(71) Applicant: Capital One Services, LLC, McLean, VA (US)

(72) Inventors: Samuel Sharpe, Cambridge, MA (US); Galen Rafferty, Mahomet, IL (US); Brian Barr, Schenectady, NY (US); Jeremy Goodsitt, Champaign, IL (US); Michael Davis, Arlington, VA (US); Taylor Turner, Richmond, VA (US); Owen Reinert, Queens, NY (US); Tyler Farnan, San Diego, CA (US)

(73) Assignee: Capital One Services, LLC, McLean, VA (US)

( * ) Notice: Subject to any disclaimer, the term of this patent is extended or adjusted under 35 U.S.C. 154(b) by 169 days.

(21) Appl. No.: 18/324,945

(22) Filed: May 26, 2023

(65) Prior Publication Data

US 2024/0396929 A1    Nov. 28, 2024

(51) Int. Cl.
*H04L 9/40*        (2022.01)

(52) U.S. Cl.
CPC ........ *H04L 63/1441* (2013.01); *H04L 63/083* (2013.01); *H04L 63/107* (2013.01); *H04L 63/1416* (2013.01); *H04L 63/1425* (2013.01)

(58) Field of Classification Search
CPC . H04L 63/1441; H04L 63/083; H04L 63/107; H04L 63/1416; H04L 63/1425; H04L 63/20; H04W 12/02; H04W 12/06
See application file for complete search history.

(56) References Cited

U.S. PATENT DOCUMENTS

| | | | | |
|---|---|---|---|---|
| 11,509,658 B1 * | 11/2022 | Kulkarni | ............... | H04W 12/60 |
| 2008/0272881 A1 * | 11/2008 | Goel | ........................ | G06F 21/83 |
| | | | | 340/5.2 |
| 2009/0245029 A1 * | 10/2009 | Kam | ...................... | G06K 19/07 |
| | | | | 235/492 |
| 2010/0065629 A1 * | 3/2010 | Wentker | ................. | G06Q 20/40 |
| | | | | 235/382 |
| 2013/0268768 A1 * | 10/2013 | Corlett | .................... | G06F 21/34 |
| | | | | 713/185 |

(Continued)

OTHER PUBLICATIONS

Wahjuni et al., "Android-based token authentication for securing the online transaction system," 2016 International Conference on Information and Communication Technology Convergence (ICTC) Year: 2016 | Conference Paper | Publisher: IEEE.*

(Continued)

*Primary Examiner* — Roderick Tolentino
(74) *Attorney, Agent, or Firm* — Foley & Lardner LLP

(57) ABSTRACT

Systems and methods for triggering token alerts. In some aspects, the system, after determining that the probability that an authentication request from an authentication token is associated with a malicious activity is above a threshold, determines whether a user device associated with the authentication token is within a threshold distance of the authentication token. In response to determining that the authentication token is not within the threshold distance of the user device, the system declines the authentication request and transmits an alert request to the authentication token to emit an audio signal from a speaker included in the authentication token.

17 Claims, 4 Drawing Sheets

(56) References Cited

U.S. PATENT DOCUMENTS

| | | | |
|---|---|---|---|
| 2018/0189470 A1* | 7/2018 | Kim | G06F 21/316 |
| 2021/0409405 A1* | 12/2021 | Salajegheh | H04L 63/0807 |
| 2022/0239484 A1* | 7/2022 | Farrell | H04L 9/3213 |
| 2022/0391926 A1* | 12/2022 | Chen | G06F 16/54 |
| 2022/0407700 A1* | 12/2022 | Panchapakesan | H04L 47/828 |
| 2023/0291563 A1* | 9/2023 | Pan | H04L 9/001 |

OTHER PUBLICATIONS

Xu et al., "A Time-Sensitive Token-Based Anonymous Authentication and Dynamic Group Key Agreement Scheme for Industry 5.0, " IEEE Transactions on Industrial Informatics Year: 2022 | vol. 18, Issue: 10 | Journal Article | Publisher: IEEE.*

* cited by examiner

100

200

400

SYSTEMS AND METHODS FOR TRIGGERING TOKEN ALERTS

SUMMARY

In the context of authentication tokens (e.g., hardware security tokens, hardware authentication devices, two-factor authentication devices, or other tokens), in response to a token providing token-derived information (e.g., credentials, identifying information, etc.) to an entity (e.g., a computing device, a website, a server, etc.), the token-derived information may allow a user to access services and other resources permitted with that token based on authentication of a request to access such services or other resources. In one use case, where the token is an access badge, a card reader may provide a request for information from the token (e.g., facility code) related to authorizing access to a restricted access point in a building. The facility code is sent to a computer system that makes decisions based on information about the credential. If the credential is included in an access list, the system unlocks the restricted access point. However, even if the authentication token is not authorized to access a restricted access point, a proximate third party such as a security professional may not be aware of this potential malicious activity.

Accordingly, methods and systems are described herein for novel uses and/or improvements with respect to authentication tokens and related artificial intelligence applications. As one example, methods and systems described herein leverage artificial intelligence applications for audibly or physically indicating to a proximate third party that an authentication request from an authentication token was determined to be potential malicious activity and was therefore denied.

Existing systems fail to trigger an alert audibly or physically to a security professional when a user attempts to access a restricted access point using an authentication token. For example, existing systems fail to trigger an alert to emit an audio signal from the authentication token to inform a security professional which authentication token to confiscate and which user is associated with the potential malicious activity. However, the difficulty in adapting existing systems for this practical benefit faces several technical challenges such as the inability for existing authentication tokens to audibly or physically indicate to a security professional that an authentication request from an authentication token was denied.

To overcome these technical deficiencies, methods and systems disclosed herein, after determining that a probability that an authentication request from an authentication token is associated with a potential malicious activity is above a threshold, determine whether a user device associated with the authentication token is within a threshold distance of the authentication token. Then, in response to determining that the authentication token is not within the threshold distance of the user device, the methods and systems decline the authentication request and transmit an alert request to the authentication token to emit an audio signal from a speaker included in the authentication token. For example, the system may detect that an authentication token is associated with a potential malicious activity and transmit an instruction to the authentication token to emit an audio signal so as to alert the security professional about the potential malicious activity. Accordingly, the methods and systems provide a way to immediately and physically indicate to a security professional that an authentication request from an authentication token was potential malicious activity and was therefore denied.

In some aspects, the problems described above may be solved using a system that may perform the following operations. The system may initiate a communication session between the authentication token and the reader. In particular, in response to detecting an authentication token at a reader, the system may initiate a communication session between the authentication token and the reader during which an authentication request is transferred. For example, the system may initiate a communication session between the security pass and the reader when the user taps the security pass at the reader. By doing so, the system is able to check whether the authentication token is able to access a restricted access point.

The system may process the authentication request. In particular, the system may process the authentication request to determine a probability that the authentication request is associated with a potential malicious activity. For example, the system may determine whether the security pass includes the code needed to unlock the door and determine the probability that the security pass is associated with a potential malicious activity. For example, the potential malicious activity may include the security pass being stolen. By doing so, the system may determine whether the authentication token is associated with a potential malicious activity or user.

The system may determine whether a user device is associated with the authentication token. In particular, the system in response to the probability being above a threshold, may determine whether a user device associated with the authentication token is within a threshold distance of the authentication token. For example, after a machine learning model determines the security token is associated with a potential malicious activity, the system may look for a user device associated with the security token. For example, the security token may be associated with a first user and the user device may include the phone of the first user. The system may search for the phone of the first user to notify the user of the security token being associated with a potential malicious activity.

The system may transmit an alert request to the authentication token. In particular, the system in response to determining that the authentication token is not within the threshold distance of the user device, may transmit an alert request to the authentication token to emit an audio signal from a speaker included in the authentication token. For example, if the system determines the mobile phone of the user associated with the security pass is not near the security pass, the system may transmit an alert to the security pass. The security pass may sound an alarm from an included speaker, which would notify any nearby security professionals of the potential malicious activity occurring. By doing so, the system is able to alert security professionals of any potential malicious activities happening.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
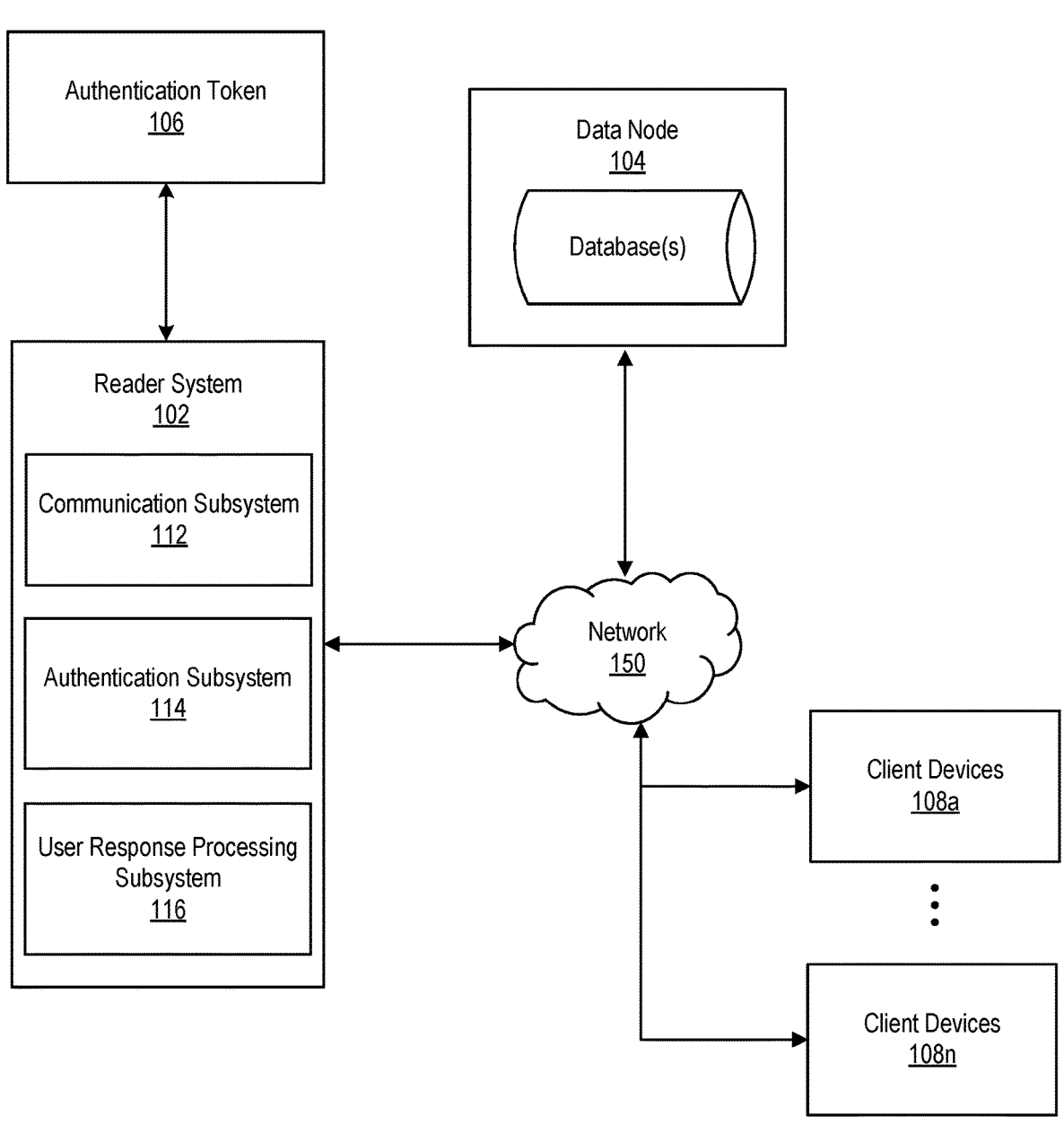
FIG. 1 shows an illustrative diagram for alerting a third party that an authentication token is potentially being used for a malicious activity, in accordance with one or more embodiments.

FIG. 1 shows an illustrative diagram for alerting a third party that an authentication token is potentially being used for a malicious activity, in accordance with one or more embodiments. Environment 100 includes authentication token 106, reader system 102, data node 104, and client devices 108a-108n. Reader system 102 may include software, hardware, or a combination of both and may reside on a physical server or a virtual server running on a physical computer system. In some embodiments, reader system 102 may be configured on a user device (e.g., a laptop computer, a smartphone, a desktop computer, an electronic tablet, or another suitable user device). In some embodiments, reader system 102 may be configured on a reader. Furthermore, reader system 102 may reside on a cloud-based system and/or interface with computer models either directly or indirectly, for example, through network 150. Reader system 102 may include communication subsystem 112, authentication subsystem 114, and/or user response processing subsystem 116. As an example, while one or more operations are described herein as being performed by components of authentication token 106, those operations may, in some embodiments, be performed by components of reader system 102.

Data node 104 may store various data, including one or more machine learning models, training data, user data profiles, input data, output data, performance data, and/or other suitable data. Data node 104 may include software, hardware, or a combination of the two. In some embodiments, reader system 102 and data node 104 may reside on the same hardware and/or the same virtual server or computing device. Network 150 may be a local area network, a wide area network (e.g., the Internet), or a combination of the two.

Client devices 108a-108n may include software, hardware, or a combination of the two. For example, each client device may include software executed on the device or may include hardware, such as a physical device. Client devices may include user devices (e.g., a laptop computer, a smartphone, a desktop computer, an electronic tablet, or another suitable user device).

Reader system 102 may receive user responses from one or more client devices. Reader system 102 may receive data using communication subsystem 112, which may include software components, hardware components, or a combination of both. For example, communication subsystem 112 may include a network card (e.g., a wireless network card and/or a wired network card) that is associated with software to drive the card and enables communication with network 150. In some embodiments, communication subsystem 112 may also receive data from and/or communicate with data node 104 or another computing device. Communication subsystem 112 may receive data, such as input data, user responses, or user preferences. Communication subsystem 112 may communicate with authentication subsystem 114 and user response processing subsystem 116.

Reader system 102 may include authentication subsystem 114. Communication subsystem 112 may pass at least a portion of the data or a pointer to the data in memory to authentication subsystem 114. Authentication subsystem 114 may include software components, hardware components, or a combination of both. For example, authentication subsystem 114 may include software components or may include one or more hardware components (e.g., processors) that are able to execute operations for processing authentication requests. In some embodiments, an authentication request may refer to a request from reader to a server in reader system 102 to authenticate that authentication token 106 is not associated with any malicious activities. Authentication subsystem 114 may access data, such as information stored on the authentication token 106. Authentication subsystem 114 may directly access data or nodes associated with client devices 108a-108n and may transmit data to these client devices. In some embodiments, user response processing subsystem 116 may receive data output from a machine learning model. Authentication subsystem 114 may, additionally or alternatively, receive data from and/or send data to communication subsystem 112 and user response processing subsystem 116.

User response processing subsystem 116 may execute tasks relating to processing verification requests and user responses. In some embodiments, a verification request may refer to a request made from reader system 102 to one or more client devices to verify that a user device for the user is near authentication token 106. User response processing subsystem 116 may include software components, hardware components, or a combination of both. For example, user response processing subsystem 116 may process user preferences. User response processing subsystem 116 may receive input data, as well as data output by client devices 108a-108n. User response processing subsystem 116 may allow reader system 102 to improve model generation, in accordance with one or more embodiments. User response processing subsystem 116 may, additionally or alternatively, receive data from and/or send data to communication subsystem 112 or authentication subsystem 114.

Figure 2:
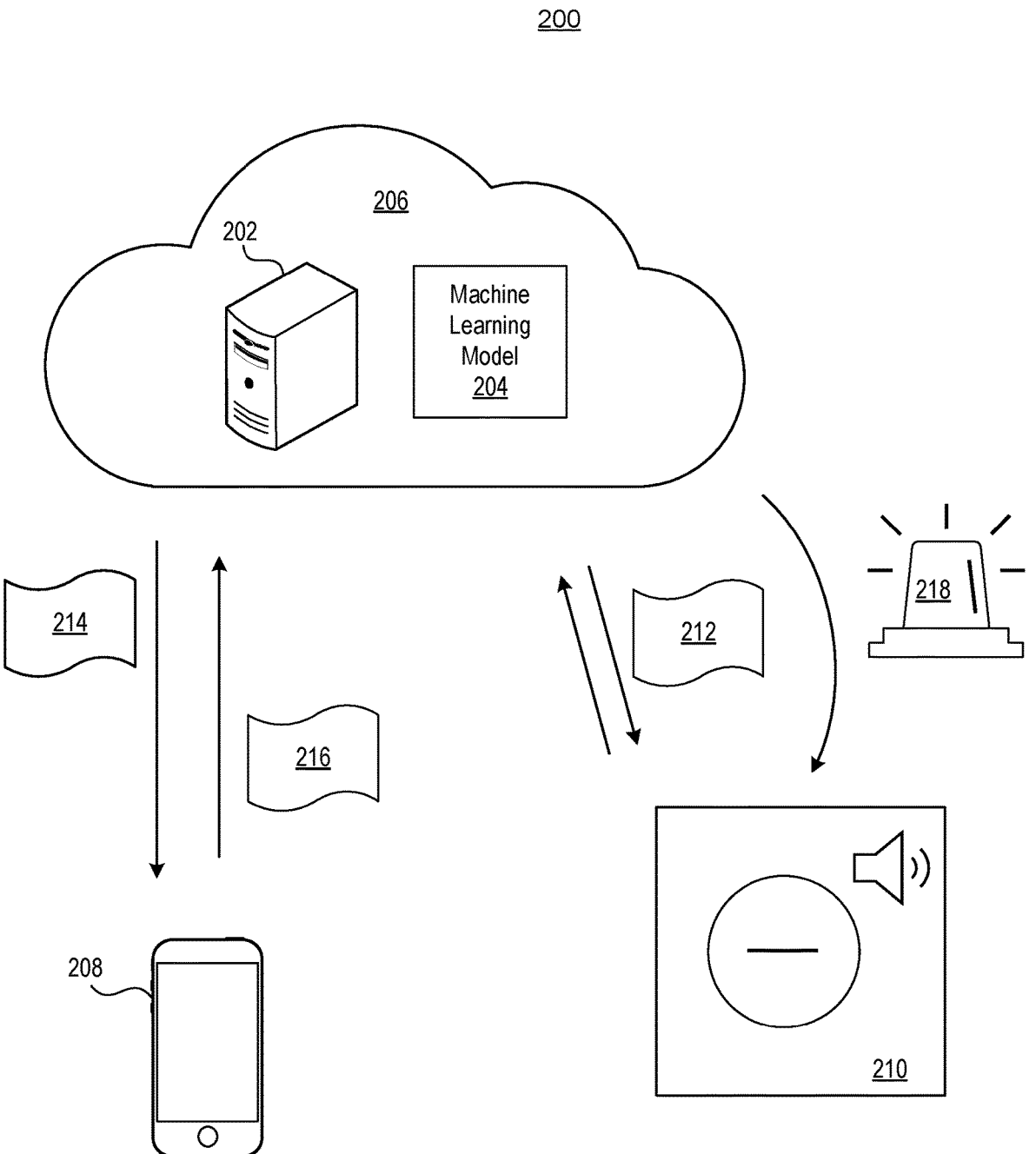
FIG. 2 shows an illustrative diagram for transmitting an alert request to the authentication token to emit an audio signal from a speaker included in the authentication token, in accordance with one or more embodiments.

FIG. 2 shows an illustrative diagram for transmitting an alert request to the authentication token to emit an audio signal from a speaker included in the authentication token, in accordance with one or more embodiments. FIG. 2 shows environment 200. Environment 200 includes server 202, machine learning model 204, cloud 206, authentication token 210, authentication request 212, verification request 214, user response 216, and alert request 218.

Server 202 may initiate a communication session between the authentication token (e.g., authentication token 210) and the reader via communication subsystem 112. In particular, in response to detecting an authentication token (e.g., authentication token 210) at a reader, server 202 may initiate a communication session between the authentication token (e.g., authentication token 210) and the reader during which an authentication request (e.g., authentication request 212) is transferred. For example, the system may initiate a communication session between the security pass and the reader when the user taps the security pass at the reader. In another example, the system may initiate a communication session between a credit card (e.g., authentication token 210) and a card reader when a user is paying for a purchase. By doing so, server 202 is able to check whether the authentication token (e.g., authentication token 210) is able to complete the activity based on the results of the authentication request.

Server 202 may process the authentication request (e.g., authentication request 212) via authentication subsystem 114. In particular, server 202 may process the authentication request (e.g., authentication request 212) to determine a probability that the authentication request (e.g., authentication request 212) is associated with a potential malicious activity. For example, the system may determine whether the security pass (e.g., authentication token 210) includes the code needed to unlock the door and determine the probability that the security pass is associated with a potential malicious activity. For example, the potential malicious activity may include the security pass being stolen. In another example, the system may determine whether a credit card (e.g., authentication token 210) is able to be used to complete a transaction and determine the probability that the credit card may be stolen. By doing so, the system may determine whether the authentication token is associated with a malicious activity or user.

In some embodiments, server 202 may process the authentication request (e.g., authentication request 212) using a machine learning model (e.g., machine learning model 204). In particular, when processing the authentication request (e.g., authentication request 212) to determine a probability that the authentication request (e.g., authentication request 212) is associated with a potential malicious activity, server 202 may process, using a machine learning model (e.g., machine learning model 204), the authentication request (e.g., authentication request 212) to determine the probability that the authentication request (e.g., authentication request 212) is associated with a potential malicious activity. For example, the system may process the attempted credit card purchase using a machine learning model to determine whether it is fraud. By doing so, the system is able to quickly determine whether the authentication request is associated with a malicious activity.

In some embodiments, machine learning model 204 may process a plurality of timestamps to determine the probability that the authentication request (e.g., authentication request 212) is associated with a malicious activity. In particular, when processing the authentication request to determine a probability that the authentication request (e.g., authentication request 212) is associated with a potential malicious activity, the server may receive, from the reader, a timestamp associated with the authentication request (e.g., authentication request 212). Machine learning model (e.g., machine learning model 204) may process a plurality of timestamps from a plurality of previous authentication requests to determine a time threshold. Machine learning model (e.g., machine learning model 204) may determine the probability based on whether the timestamp associated with the authentication request (e.g., authentication request 212) meets the time threshold. For example, machine learning model 204 may process the timestamp associated with previous purchases made with the credit card (e.g., authentication token 210). Therefore, machine learning model 204 may determine whether the current transaction is associated with fraud based on the time the purchase takes place. By doing so, the system may determine whether an authentication token is associated with a malicious user by processing the timestamp of the authentication request.

Server 202 may determine whether a user device (e.g., user device 208) is associated with the authentication token (e.g., authentication token 210). In particular, server 202 in response to the probability being above a threshold, may determine whether a user device (e.g., user device 208) associated with the authentication token (e.g., authentication token 210) is within a threshold distance of the authentication token. In some embodiments, server 202 may determine the location of the user device (e.g., user device 208). In particular, the location of the user device is associated with geographical position system (GPS) information received from the user device. In some embodiments, server 202 when determining whether a user device associated with the authentication token is within a threshold distance of the authentication token may determine whether the authentication token is within a location range selected by a user. For example, after machine learning model 204 determines the security token (e.g., authentication token 210) is associated with a malicious activity, the system may look for a user device associated with the security token (e.g., authentication token 210). For example, the security token (e.g., authentication token 210) may be associated with a first user and the user device may include the phone of the first user. In another example, the system may determine whether a phone associated with the credit card (e.g., authentication token 210) is near the credit card. The system may determine the location of user device 208 using GPS information received from the device. After that, the system may check the location range selected by the user. Then, the system may determine whether the phone is within that location range. By doing so, the system may locate the phone of the first user to verify the authentication token being associated with a malicious activity.

Server 202 may transmit an alert request (e.g., alert request 218) to the authentication token (e.g., authentication token 210). In particular, server 202 in response to determining that the authentication token (e.g., authentication token 210) is not within the threshold distance of the user device, may transmit an alert request to the authentication token (e.g., authentication token 210) to emit an audio signal from a speaker included in the authentication token (e.g., authentication token 210). For example, if the system determines the phone of the user associated with the security pass is not near the security pass (e.g., authentication token 210), the system may transmit an alert to the security pass (e.g., authentication token 210). The security pass may sound an alarm, which would notify any nearby security professionals of the malicious activity occurring. In another example, the system may transmit alert request 218 to the credit card (e.g., authentication token 210). Therefore, an alarm will sound from the speaker built into the credit card. In some embodiments, the sound for the audio signal is selected based on input from the user device (e.g., user device 208). For example, the sound coming from the credit card (e.g., authentication token 210) is selected beforehand by the user. By doing so, the system is able to alert security professionals of any potential malicious activities happening.

In some embodiments, server 202 may transmit a verification request (e.g., verification request 214) to the user device (e.g., user device 208). In particular, in response to determining that the authentication token is within the threshold distance of the user device, server 202 may transmit to the user device (e.g., user device 208), a verification request (e.g., verification request 214) for the authentication request (e.g., authentication request 212). Then, in response to receiving a user response (e.g., user response 216) to the verification request (e.g., verification request 214), the user device (e.g., user device 208) may transmit the user response (e.g., user response 216) to the reader (e.g., server 202). For example, the system may send a verification request to the user's phone. The verification request may ask the user to verify the authentication request is being originating by a trusted user. By doing so, the system may verify the authentication request.

In some embodiments, server 202 may receive a user response. In particular, in response to receiving a user response indicating denial of the authentication request, server 202 may transmit a shutdown request to the authentication token (e.g., authentication token 210) to disconnect a circuit connecting the speaker, thereby rendering the authentication token (e.g., authentication token 210) unusable for further authentication requests. For example, a user may respond by indicating they did not recently use their credit card (e.g., authentication token 210) to make a purchase. As a result, the system may shut off the alarm and disable the credit card. By doing so, the system is able to disable the authentication token if the user verifies there is a malicious activity taking place.

In some embodiments, server 202 may transmit a cancel request to the authentication token (e.g., authentication token 210). In particular, in response to receiving a user response (e.g., user response 216) indicating approval of the authentication request (e.g., authentication request 212), server 202 may approve the authentication request (e.g., authentication request 212) and transmitting a cancel request to the authentication token (e.g., authentication token 210) to cease emitting the audio signal. For example, the system may disable the alarm on the credit card (e.g., authentication token 210) after receiving from the user confirmation that there is no malicious activity. By doing so, the system may disable the alarm.

In some embodiments, the system may receive user preferences. In particular, the system may receive one or more user preferences related to future authentication requests. The system may determine the threshold for the probability based on the one or more user preferences. In some embodiments, the one or more user preferences may include a geographical range, a time of day range, or an operation range associated with the authentication token (e.g., authentication token 210). For example, the user may provide certain merchants, locations, times, and a transaction range where the credit card (e.g., authentication token 210) is allowed to be used. Therefore, the system may deny transactions that fall out of those user preferences.

In some embodiments, the system may associate a new user device with the authentication token (e.g., authentication token 210). In particular, the system may receive, from the user device (e.g., user device 208), a request to associate a new user device with the authentication token. For example, the user may request to add their computer as another user device to be associated with their credit card (e.g., authentication token 210).

In some embodiments, the system may disable the authentication token (e.g., authentication token 210) before initiating a second communication session. In particular, prior to initiating a second communication session between the authentication token (e.g., authentication token 210) and the reader, the system may receive, from the user device (e.g., user device 208), an advance request to disable the authentication token (e.g., authentication token 210). The system may at a time subsequent to receiving the advance request, in response to detecting the authentication token (e.g., authentication token 210) at the reader, transmit a shutdown request to the authentication token (e.g., authentication token 210). For example, the user may report the credit card (e.g., authentication token 210) is missing. By doing so, the system may disable the authentication token.

Figure 3:
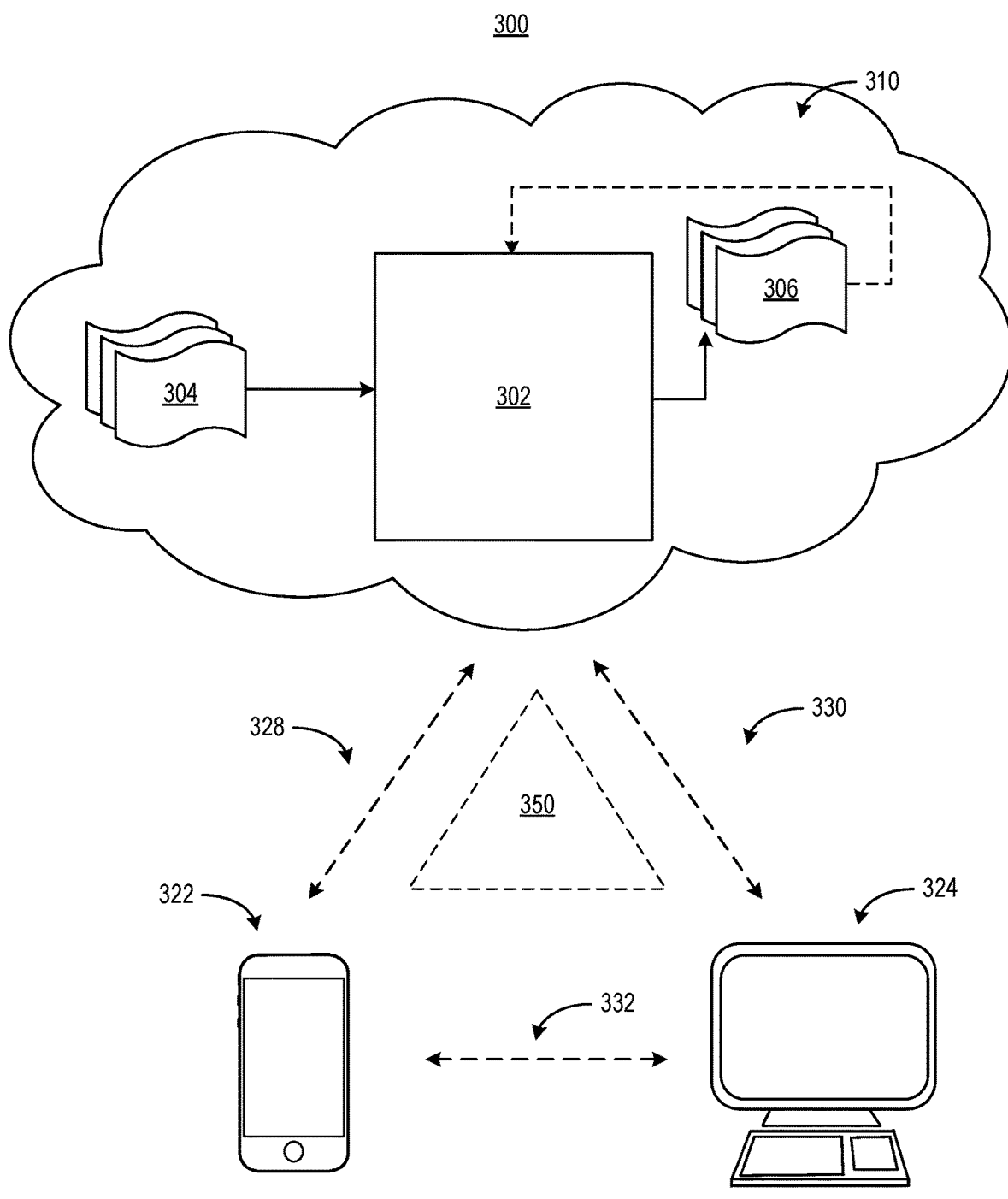
FIG. 3 shows illustrative components for a system used to trigger an alert from a speaker included in an authentication token based on detecting potential malicious activity, in accordance with one or more embodiments.

FIG. 3 shows illustrative components for a system used to trigger an alert from a speaker included in an authentication token based on detecting potential malicious activity, in accordance with one or more embodiments. For example, FIG. 3 may show illustrative components for indicating to a merchant that an authentication token is potentially being used for fraudulent activities. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communication paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include reader system 102, communication subsystem 112, authentication subsystem 114, user response processing subsystem 116, authentication token 106, data node 104, or client devices 108a-108n, and may be connected to network 150. Cloud components 310 may access authentication token 106 and client devices 108a-108n.

Cloud components 310 may include model 302, which may be a machine learning model, artificial intelligence model, etc. (which may be referred collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., detecting whether an authentication token is associated with a malicious activity).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., whether an activity associated with the authentication token is malicious).

In some embodiments, the model (e.g., model 302) may automatically perform actions based on outputs 306. In some embodiments, the model (e.g., model 302) may not perform any actions. The output of the model (e.g., model 302) may be used to determine the probability that the authentication token is associated with a potential malicious activity System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDOS protection, and API layer 350 may use RESTful APIs as standard for external integration.

Figure 4:
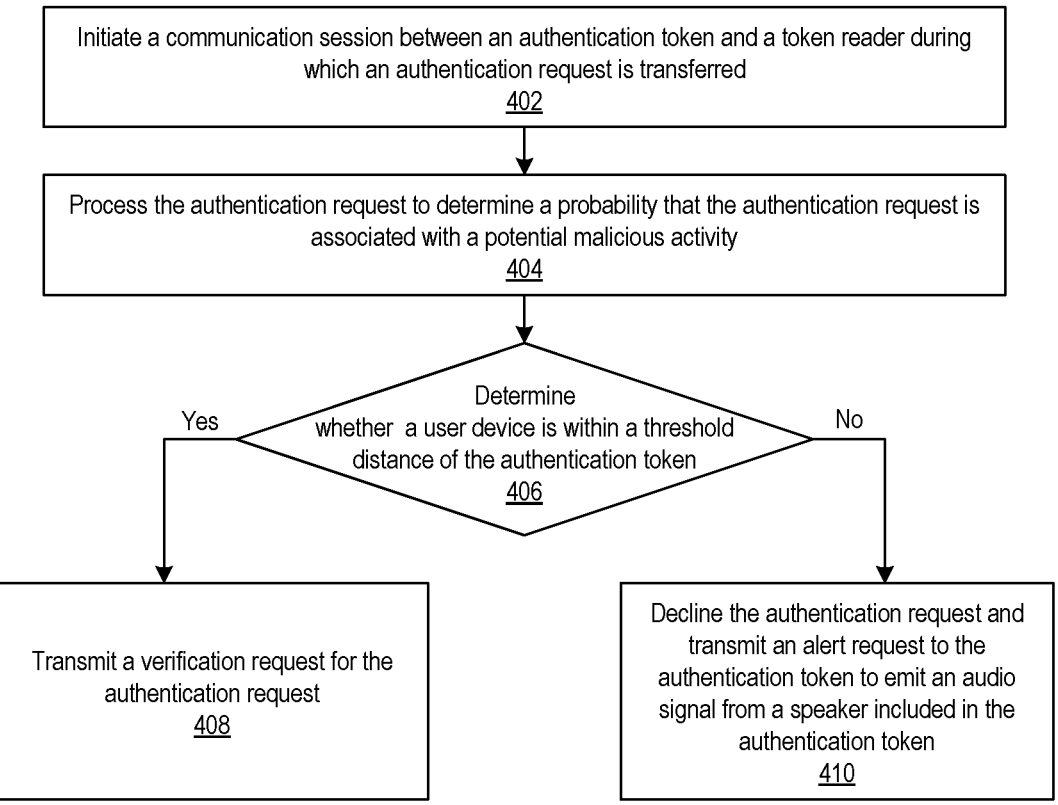
FIG. 4 shows a flowchart of the steps involved in triggering an alert from a speaker included in an authentication token based on detecting potential malicious activity, in accordance with one or more embodiments.

FIG. 4 shows a flowchart of the steps involved in triggering an alert included in an authentication token based on detecting malicious activity, in accordance with one or more embodiments. For example, the system may use process 400 (e.g., as implemented on one or more system components described above) in order to alert a merchant of a potential fraudulent activity.

At operation 402, process 400 (e.g., using one or more components described above) may initiate a communication session between the authentication token and a token reader during which an authentication request is transferred. For example, in response to detecting an authentication token at a reader, communication subsystem 112, which may reside on cloud components 310 or cloud 206, may initiate a communication session between the authentication token (e.g., authentication token 210) and the reader during which an authentication request (e.g., authentication request 212) is transferred. For example, the system may initiate a communication session between a credit card (e.g., authentication token 210) and a card reader when a user is paying for a purchase using communication paths 328, 330, and 332. By doing so, the system is able to check whether the authentication token (e.g., authentication token 210) is able to complete the activity based on the results of the authentication request.

At operation 404, process 400 (e.g., using one or more components described above) may process the authentication request to determine a probability that the authentication request is associated with a potential malicious activity. For example, the system may process the authentication request (e.g., authentication request 212) to determine a probability that the authentication request (e.g., authentication request 212) is associated with a potential malicious activity. For example, authentication subsystem 114 may determine whether a credit card (e.g., authentication token 210) is able to be used to complete a transaction and determine the probability that the credit card may be stolen. By doing so, the system may determine whether the authentication token is associated with a potential malicious activity.

In some embodiments, the system may process the authentication request using a machine learning model. For example, when processing the authentication request (e.g., authentication request 212) to determine a probability that the authentication request (e.g., authentication request 212) is associated with a potential malicious activity, the system may process, using a machine learning model (e.g., machine learning model 204), the authentication request (e.g., authentication request 212) to determine the probability that the authentication request (e.g., authentication request 212 or input 304) is associated with a potential malicious activity. For example, authentication subsystem 114 may process the attempted credit card purchase using a machine learning model (e.g., model 302, machine learning model 204) to determine whether it is fraud. By doing so, the system is able to quickly determine whether the authentication request is associated with a potential malicious activity.

In some embodiments, the system may process a plurality of timestamps to determine the probability that the authentication request is associated with a malicious activity. For example, when processing the authentication request to determine a probability that the authentication request (e.g., authentication request 212) is associated with a potential malicious activity, the system may receive, from the reader, a timestamp associated with the authentication request (e.g., authentication request 212). The machine learning model (e.g., machine learning model 204 or model 302) may process a plurality of timestamps from a plurality of previous authentication requests to determine a time threshold. Machine learning model (e.g., machine learning model 204 or model 302) may determine the probability based on whether the timestamp associated with the authentication request (e.g., authentication request 212) meets the time threshold. For example, machine learning model 204 may process the timestamp associated with previous purchases made with the credit card (e.g., authentication token 210). Therefore, machine learning model 204 may determine whether the current transaction is associated with fraud based on the time the purchase takes place. By doing so, the system may determine whether an authentication token is associated with a malicious user by processing the time-stamp of the authentication request.

At operation 406, process 400 (e.g., using one or more components described above) may determine whether a user device is within a threshold distance of the authentication token. For example, the system in response to the probability being above a threshold, may determine whether a user device (e.g., user device 208 or mobile device 322 or user terminal 324) is associated with the authentication token (e.g., authentication token 210) is within a threshold distance of the authentication token. In some embodiments, the system may determine the location of the user device (e.g., user device 208 or mobile device 322 or user terminal 324). For example, the location of the user device is associated with geographical position system (GPS) information received from the user device. In some embodiments, the system when determining whether a user device associated with the authentication token is within a threshold distance of the authentication token may determine whether the authentication token is within a location range selected by a user. For example, after the machine learning model (e.g., machine learning model 204 or model 302) determines the security token (e.g., authentication token 210) is associated with a malicious activity, the system may look for a user device associated with the security token (e.g., authentication token 210). For example, the security token (e.g., authentication token 210) may be associated with a first user and the user device may include the phone of the first user. In another example, authentication subsystem 114 may determine whether a phone associated with the credit card (e.g., authentication token 210) is near the credit card. The system may determine the location of user device 208 using GPS information received from the device. After that, the system may check the location range selected by the user. Then, the system may determine whether the phone is within that location range. By doing so, the system may locate the phone of the first user to verify the authentication token being associated with a malicious activity.

At operation 408, process 400 (e.g., using one or more components described above) may transmit a verification request for the authentication request. For example, in response to determining that the authentication token (e.g., authentication token 210) is within the threshold distance of the user device (e.g., user device 208 or mobile device 322 or user terminal 324), the system may transmit to the user device (e.g., user device 208 or mobile device 322 or user terminal 324), a verification request (e.g., verification request 214) for the authentication request (e.g., authentication request 212). Then, in response to receiving a user response (e.g., user response 216) to the verification request (e.g., verification request 214), the user device (e.g., user device 208 or mobile device 322 or user terminal 324) may transmit the user response (e.g., user response 216) to the reader (e.g., server 202) using communication paths 328, 330, and 332. For example, authentication subsystem 114 may send a verification request to the user's phone. The verification request may ask the user to verify the authentication request is being originating by a trusted user. By doing so, the system may verify the authentication request.

At operation 410, process 400 (e.g., using one or more components described above) may decline the authentication request and transmit an alert request to the authentication token to emit an audio signal from a speaker included in the authentication token. For example, the system in response to determining that the authentication token (e.g., authentication token 210) is not within the threshold distance of the user device (e.g., user device 208), may transmit an alert request (e.g., alert request 218) to the authentication token (e.g., authentication token 210) to emit an audio signal from a speaker included in the authentication token (e.g., authentication token 210). For example, if authentication subsystem 114 determines the phone of the user associated with the security pass is not near the security pass (e.g., authentication token 210), authentication subsystem 114 may transmit an alert to the security pass (e.g., authentication token 210). The security pass may sound an alarm, which would notify any nearby security professionals of the malicious activity occurring. In another example, the system may transmit alert request 218 to the credit card (e.g., authentication token 210). Therefore, an alarm will sound from the speaker built into the credit card. In some embodiments, the sound for the audio signal is selected based on input from the user device (e.g., user device 208 or mobile device 322, or user terminal 324). For example, the sound coming from the credit card (e.g., authentication token 210) is selected beforehand by the user. By doing so, the system is able to alert security professionals of any potential malicious activities happening.

In some embodiments, the system may receive a user response. For example, in response to receiving a user response indicating denial of the authentication request, the system may transmit a shutdown request to the authentication token (e.g., authentication token 210) to disconnect a circuit connecting the speaker, thereby rendering the authentication token (e.g., authentication token 210) unusable for further authentication requests. For example, a user may respond by indicating they did not recently use their credit card (e.g., authentication token 210) to make a purchase via user response processing subsystem 116. As a result, user response processing subsystem 116 may shut off the alarm and disable the credit card using server 202, user device 208, mobile device 322, or user terminal 324 via communication paths 328, 330, and 332. By doing so, the system is able to disable the authentication token if the user verifies there is a malicious activity taking place.

In some embodiments, the system may transmit a cancel request to the authentication token. For example, in response to receiving a user response (e.g., user response 216) indicating approval of the authentication request (e.g., authentication request 212), server 202 may approve the authentication request (e.g., authentication request 212) and transmitting a cancel request to the authentication token (e.g., authentication token 210) to cease emitting the audio signal. For example, authentication subsystem 114 may disable the alarm on the credit card (e.g., authentication token 210) after receiving from the user confirmation from user response processing subsystem 116 via communication subsystem 112 that there is no malicious activity. By doing so, the system may disable the alarm.

In some embodiments, the system may receive user preferences. For example, the system may receive one or more user preferences related to future authentication requests. The system may determine the threshold for the probability based on the one or more user preferences. In some embodiments, the one or more user preferences may include a geographical range, a time of day range, or an operation range associated with the authentication token (e.g., authentication token 210). For example, the user may provide certain merchants, locations, times, and a transaction range where the credit card (e.g., authentication token 210) is allowed to be used via user response processing subsystem 116. Therefore, the system may deny transactions that fall out of those user preferences.

In some embodiments, the system may associate a new user device with the authentication token. For example, the system may receive, from the user device (e.g., user device 208 or mobile device 322 or user terminal 324), a request to associate a new user device with the authentication token via communication paths 328, 330, and 332. For example, the user may request to add their computer as another user device to be associated with their credit card (e.g., authentication token 210) via user response processing subsystem 116.

In some embodiments, the system may disable the authentication token before initiating a second communication session. For example, prior to initiating a second communication session between the authentication token (e.g., authentication token 210) and the reader, the system may receive, from the user device (e.g., user device 208 or mobile device 322 or user terminal 324), an advance request to disable the authentication token (e.g., authentication token 210). The system may at a time subsequent to receiving the advance request, in response to detecting the authentication token (e.g., authentication token 210) at the reader, transmit a shutdown request to the authentication token (e.g., authentication token 210). For example, the user may report the credit card (e.g., authentication token 210) is missing via user response processing subsystem 116. By doing so, the system may disable the authentication token.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for triggering an alert included in an authentication token based on detecting malicious activity, the method comprising: in response to detecting an authentication token at a token reader, initiating a communication session between the authentication token and the token reader during which an authentication request is transferred; processing, using a machine learning model, the authentication request to determine a probability that the authentication request is associated with a potential malicious activity; in response to the probability being above a threshold, determining whether a user device associated with the authentication token is within a threshold distance of the authentication token, wherein a location of the user device is associated with geographical positioning system (GPS) information received from the user device; and in response to determining that the authentication token is not within the threshold distance of the user device, declining the authentication request and transmitting an alert request to the authentication token to emit an audio signal from a speaker included in the authentication token.

2. A method for triggering an alert included in an authentication token based on detecting malicious activity, the method comprising: in response to detecting an authentication token at a reader, initiating a communication session between the authentication token and the reader during which an authentication request is transferred; processing the authentication request to determine a probability that the authentication request is associated with a potential malicious activity; in response to the probability being above a threshold, determining whether a user device associated with the authentication token is within a threshold distance of the authentication token; and in response to determining that the authentication token is not within the threshold distance of the user device, transmitting an alert request to the authentication token to emit an audio signal from a speaker included in the authentication token.

3. A method, the method comprising: processing an authentication request from a token to determine a probability that the authentication request is associated with a potential malicious activity; in response to the probability being above a threshold, determining whether a user device associated with the token is within a threshold distance of the token; and in response to determining that the token is not within the threshold distance of the user device, transmitting an alert request to the token to emit an audio signal from a speaker included in the token.

4. The method of any one of the preceding embodiments, further comprising in response to determining that the authentication token is within the threshold distance of the user device, transmitting, to the user device, a verification request for the authentication request; and in response to receiving a user response to the verification request, transmitting the user response to the token reader.

5. The method of any one of the preceding embodiments, wherein a location of the user device is associated with geographical position system (GPS) information received from the user device.

6. The method of any one of the preceding embodiments, wherein determining whether a user device associated with the authentication token is within a threshold distance of the authentication token comprises determining whether the authentication token is within a location range selected by a user.

7. The method of any one of the preceding embodiments, further comprising receiving one or more user preferences related to future authentication requests; and determining the threshold for the probability based on the one or more user preferences.

8. The method of any one of the preceding embodiments, wherein the one or more user preferences comprises a geographical range, a time of day range, or an operation range associated with the authentication token.

9. The method of any one of the preceding embodiments, wherein processing the authentication request to determine a probability that the authentication request is associated with a potential malicious activity comprises: processing, using a machine learning model, the authentication request to determine the probability that the authentication request is associated with a potential malicious activity.

10. The method of any one of the preceding embodiments, wherein transmitting an alert request to the authentication token to emit an audio signal from a speaker included in the authentication token further comprises transmitting a sound for the audio signal selected based on input from the user device.

11. The method of any one of the preceding embodiments, further comprising receiving, from the user device, a request to associate a new user device with the authentication token.

12. The method of any one of the preceding embodiments, further comprising in response to receiving a user response indicating denial of the authentication request, transmitting a shutdown request to the authentication token to disconnect a circuit connecting the speaker, thereby rendering the authentication token unusable for further authentication requests.

13. The method of any one of the preceding embodiments, further comprising in response to receiving a user response indicating approval of the authentication request, approving the authentication request and transmitting a cancel request to the authentication token to cease emitting the audio signal.

14. The method of any one of the preceding embodiments, further comprising prior to initiating a second communication session between the authentication token and the reader, receiving, from the user device, an advance request to disable the authentication token; and at a time subsequent to receiving the advance request, in response to detecting the authentication token at the reader, transmitting a shutdown request to the authentication token.

15. The method of any one of the preceding embodiments, wherein processing the authentication request to determine a probability that the authentication request is associated with a potential malicious activity comprises: receiving, from the reader, a timestamp associated with the authentication request; processing, using a machine learning model, a plurality of timestamps from a plurality of previous authentication requests to determine a time threshold; and determining the probability based on whether the timestamp associated with the authentication request meets the time threshold.

16. A tangible, non-transitory, machine-readable medium storing instructions that, when executed by a data processing apparatus, cause the data processing apparatus to perform operations comprising those of any of embodiments 1-15.

17. A system comprising one or more processors; and memory storing instructions that, when executed by the processors, cause the processors to effectuate operations comprising those of any of embodiments 1-15.

18. A system comprising means for performing any of embodiments 1-15.

19. A system comprising cloud-based circuitry for performing any of embodiments 1-15.

What is claimed is:

1. A system for triggering an alert included in an authentication token based on detecting malicious activity, comprising:

one or more processors; and a non-transitory, computer-readable storage medium storing instructions that, when executed by the one or more processors, cause operations comprising:

detecting the authentication token at a token reader, wherein the authentication token is built into a security pass;

in response to detecting the authentication token at the token reader, initiating a communication session between the authentication token and the token reader during which an authentication request is transferred;

processing, using a machine learning model, the authentication request to determine a probability that the authentication request satisfies a time threshold corresponding to one or more purchases associated with the security pass;

in response to the probability being above a threshold, determining whether a user device associated with the authentication token is within a threshold distance of the authentication token, wherein a location of the user device is associated with geographical positioning system (GPS) information received from the user device; and in response to determining that the authentication token is not within the threshold distance of the user device, declining the authentication request, disabling the authentication token, and transmitting an alert request to the authentication token to emit an audio signal from a speaker included in the security pass.

2. The system of claim 1, further comprising:

in response to determining that the authentication token is within the threshold distance of the user device, transmitting, to the user device, a verification request for the authentication request; and in response to receiving a user response to the verification request, transmitting the user response to the token reader.

3. A method for triggering an alert included in an authentication token based on detecting malicious activity, the method comprising:

detecting the authentication token at a reader, wherein the authentication token is built into a security pass;

in response to detecting the authentication token at the reader, initiating a communication session between the authentication token and the reader during which an authentication request is transferred;

processing, using a machine learning model, the authentication request to determine a probability that the authentication request satisfies a time threshold corresponding to one or more purchases associated with the security pass;

in response to the probability being above a threshold, determining whether a user device associated with the authentication token is within a threshold distance of the authentication token, wherein a location of the user device is associated with geographical information received from the user device; and in response to determining that the authentication token is not within the threshold distance of the user device, declining the authentication request, disabling the authentication token, and transmitting an alert request to the authentication token to emit an audio signal from a speaker included in the security pass.

4. The method of claim 3, further comprising:

in response to determining that the authentication token is within the threshold distance of the user device, transmitting, to the user device, a verification request for the authentication request; and in response to receiving a user response to the verification request, transmitting the user response to the reader.

5. The method of claim 3, wherein determining whether a user device associated with the authentication token is within a threshold distance of the authentication token comprises determining whether the authentication token is within a location range selected by a user.

6. The method of claim 3, further comprising:

receiving one or more user preferences related to future authentication requests; and determining the threshold for the probability based on the one or more user preferences.

7. The method of claim 6, wherein the one or more user preferences comprises a geographical range, a time of day range, or an operation range associated with the authentication token.

8. The method of claim 3, wherein transmitting the alert request to the authentication token to emit the audio signal from the speaker included in the security pass further comprises transmitting a sound for the audio signal selected based on input from the user device.

9. The method of claim 3, further comprising:

receiving, from the user device, a request to associate a new user device with the authentication token.

10. The method of claim 4, further comprising:

in response to receiving a user response indicating denial of the authentication request, transmitting a shutdown request to the authentication token to disconnect a circuit connecting the speaker included in the security pass, thereby rendering the authentication token unusable for further authentication requests.

11. The method of claim 4, further comprising:

in response to receiving a user response indicating approval of the authentication request, approving the authentication request and transmitting a cancel request to the authentication token to cease emitting the audio signal.

12. The method of claim 3, further comprising:

prior to initiating a second communication session between the authentication token and the reader, receiving, from the user device, an indication that the authentication token is missing and an advance request to disable the authentication token; and at a time subsequent to receiving the advance request, in response to detecting the authentication token at the reader, transmitting a shutdown request to the authentication token.

13. The method of claim 3, wherein processing the authentication request to determine the probability that the authentication request satisfies the time threshold corresponding to the one or more purchases associated with the security pass comprises:

receiving, from the reader, a timestamp associated with the authentication request;

processing, using a machine learning model, a plurality of timestamps from a plurality of previous authentication requests to determine the time threshold; and determining the probability based on whether the timestamp associated with the authentication request satisfies the time threshold.

14. A non-transitory, computer-readable storage medium storing instructions that, when executed by one or more processors, cause operations comprising:

detecting a token at a token reader, wherein the token is built into a security pass;

in response to detecting the token at the token reader, initiating a communication session between the token and the token reader during which an authentication request is transferred;

processing, using a machine learning model, the authentication request from the token to determine a probability that the authentication request satisfies a time threshold corresponding to one or more purchases associated with the security pass;

in response to the probability being above a threshold, determining whether a user device associated with the token is within a threshold distance of the token, wherein a location of the user device is associated with geographical information received from the user device; and in response to determining that the token is not within the threshold distance of the user device, declining the authentication request, disabling the token and, transmitting an alert request to the token to emit an audio signal from a speaker included in the security pass.

15. The non-transitory, computer-readable storage medium of claim 14, wherein the instructions further cause the one or more processors to perform operations comprising:

in response to determining that the token is within the threshold distance of the user device, transmitting, to the user device, a verification request for the authentication request; and in response to receiving a user response indicating approval of the authentication request, transmitting a cancel request to the token to cease emitting the audio signal.

16. The non-transitory, computer-readable storage medium of claim 15, wherein the instructions further cause the one or more processors to cause operations comprising:

in response to receiving a user response indicating denial of the authentication request, transmitting a shutdown request to the token to disconnect a circuit connecting the speaker included in the security pass, thereby rendering the token unusable for further authentication requests.

17. The non-transitory, computer-readable storage medium of claim 14, wherein the instructions further cause the one or more processors to cause operations comprising:

receiving one or more user preferences related to future authentication requests; and determining the threshold for the probability based on the one or more user preferences.

* * * * *